(12) United States Patent
Kley

(10) Patent No.: US 6,931,710 B2
(45) Date of Patent: Aug. 23, 2005

(54) MANUFACTURING OF MICRO-OBJECTS SUCH AS MINIATURE DIAMOND TOOL TIPS

(75) Inventor: Victor B. Kley, Berkeley, CA (US)

(73) Assignee: General Nanotechnology LLC, Berkeley, CA (US)

( * ) Notice: Subject to any disclaimer, the term of this patent is extended or adjusted under 35 U.S.C. 154(b) by 0 days.

(21) Appl. No.: 10/367,113

(22) Filed: Feb. 14, 2003

(65) Prior Publication Data

US 2005/0115047 A1 Jun. 2, 2005

Related U.S. Application Data

(62) Division of application No. 09/774,400, filed on Jan. 30, 2001, now abandoned.

(51) Int. Cl.[7] .......................... B23Q 3/00; B23Q 1/00; B21D 39/03; B23P 21/00
(52) U.S. Cl. ........................... 29/467; 29/428; 29/718; 29/283.5
(58) Field of Search .......................... 29/428, 464, 467, 29/469, 505, 525, 34 R, 566, 566.1, 718, 29/283.5; 206/372

(56) References Cited

U.S. PATENT DOCUMENTS

| | | |
|---|---|---|
| 3,586,865 A | 6/1971 | Baker et al. |
| 3,812,288 A | 5/1974 | Walsh et al. |
| 4,115,806 A | 9/1978 | Morton |
| 4,604,520 A | 8/1986 | Pohl |
| 4,672,559 A | 6/1987 | Jansson et al. |
| 4,673,477 A | 6/1987 | Ramalingam et al. |
| RE32,457 E | 7/1987 | Matey |
| 4,681,451 A | 7/1987 | Guerra et al. |

(Continued)

FOREIGN PATENT DOCUMENTS

EP 0325056 7/1989

(Continued)

OTHER PUBLICATIONS

Jaschke et al. "Deposition of Organic Material by the Tip of a Scanning Force Microscope," Langmuir 11:1061–1064 (1995).

(Continued)

*Primary Examiner*—John C. Hong
(74) *Attorney, Agent, or Firm*—Townsend and Townsend and Crew LLP

(57) ABSTRACT

Techniques for affixing a micro-object to a mounting structure at a desired relative orientation. A shaped portion of a workpiece is caused to become embedded in a reference structure at a first relative orientation. The workpiece is parted into first and second portions, the first portion of which includes the embedded shaped portion of the workpiece and defines the micro-object. The reference structure is aligned with the mounting structure at a second relative orientation, the first and second relative orientations defining the desired relative orientation of the micro-object and the mounting structure. The micro-object is bonded to the mounting structure while the micro-object remains embedded in the reference structure and the reference structure remains aligned with the mounting structure at the second relative orientation. The micro-object is separated from the reference structure, whereupon the micro-object remains in the desired relative orientation with respect to the mounting structure. The micro-object may have dimensions less than 200 microns, and possibly on the order of 15–25 microns.

57 Claims, 3 Drawing Sheets

U.S. PATENT DOCUMENTS

| | | |
|---|---|---|
| 4,697,594 A | 10/1987 | Mayo, Jr. |
| 4,793,201 A | 12/1988 | Kanai et al. |
| 4,831,614 A | 5/1989 | Duerig |
| 4,866,986 A | 9/1989 | Cichanski |
| 4,907,195 A | 3/1990 | Kazan et al. |
| 4,924,091 A | 5/1990 | Hansma et al. |
| 4,954,704 A | 9/1990 | Elings et al. |
| 4,999,495 A | 3/1991 | Miyata et al. |
| 5,001,344 A | 3/1991 | Kato et al. |
| 5,010,249 A | 4/1991 | Nishikawa |
| 5,015,850 A | 5/1991 | Zdeblick |
| 5,018,865 A | 5/1991 | Ferrell et al. |
| 5,025,346 A | 6/1991 | Tang |
| 5,038,322 A | 8/1991 | Van Loenen |
| 5,043,577 A | 8/1991 | Pohi |
| 5,047,633 A | 9/1991 | Finlan et al. |
| 5,047,649 A | 9/1991 | Hodgson et al. |
| 5,072,116 A | 12/1991 | Kawade et al. |
| 5,081,390 A | 1/1992 | Elings et al. |
| 5,105,305 A | 4/1992 | Betzig et al. |
| 5,107,112 A | 4/1992 | Yanagisawa et al. |
| 5,108,865 A | 4/1992 | Zwaldo et al. |
| 5,118,541 A | 6/1992 | Yamamoto et al. |
| 5,138,159 A | 8/1992 | Takase et al. |
| 5,142,145 A | 8/1992 | Yasutake |
| 5,148,308 A | 9/1992 | Miyauchi |
| 5,155,589 A | 10/1992 | Gere |
| 5,166,520 A | 11/1992 | Prater et al. |
| 5,187,367 A | 2/1993 | Miyazaki |
| RE34,214 E | 4/1993 | Carlsson et al. |
| 5,210,410 A | 5/1993 | Barrett |
| 5,216,631 A | 6/1993 | Sliwa |
| 5,220,555 A | 6/1993 | Yanagisawa |
| 5,231,286 A | 7/1993 | Kajimura et al. |
| 5,241,527 A | 8/1993 | Eguchi et al. |
| 5,249,077 A | 9/1993 | Laronga |
| 5,254,209 A * | 10/1993 | Schmidt et al. ............ 216/2 |
| 5,254,854 A | 10/1993 | Betzig |
| 5,260,824 A | 11/1993 | Okada et al. |
| 5,276,672 A | 1/1994 | Miyazaki |
| 5,278,704 A | 1/1994 | Matsuda |
| 5,283,437 A | 2/1994 | Greschner et al. |
| 5,289,004 A | 2/1994 | Okada et al. |
| 5,289,408 A | 2/1994 | Mimura |
| 5,297,130 A | 3/1994 | Tagawa |
| 5,299,184 A | 3/1994 | Yamano |
| 5,302,239 A | 4/1994 | Roe et al. |
| 5,308,974 A | 5/1994 | Elings et al. |
| 5,317,152 A | 5/1994 | Takamatsu |
| 5,317,533 A | 5/1994 | Quate |
| 5,319,961 A | 6/1994 | Matsuyama et al. |
| 5,319,977 A | 6/1994 | Quate et al. |
| 5,322,735 A | 6/1994 | Fridez et al. |
| RE34,708 E | 8/1994 | Hansma et al. |
| 5,338,932 A | 8/1994 | Theodore et al. |
| 5,343,460 A | 8/1994 | Miyazaki |
| 5,349,735 A | 9/1994 | Kawase |
| 5,353,632 A | 10/1994 | Nakagawa |
| 5,354,985 A | 10/1994 | Quate |
| 5,357,109 A | 10/1994 | Kusumoto |
| 5,357,110 A | 10/1994 | Statham |
| 5,360,977 A | 11/1994 | Onuki et al. |
| 5,362,963 A | 11/1994 | Kopelman et al. |
| 5,373,494 A | 12/1994 | Kawagishi |
| 5,389,475 A | 2/1995 | Yanagisawa |
| 5,392,275 A | 2/1995 | Kawada et al. |
| 5,393,647 A | 2/1995 | Neukermans et al. |
| 5,396,483 A | 3/1995 | Matsida |
| 5,408,094 A | 4/1995 | Kajimura |
| 5,412,641 A | 5/1995 | Shinjo |
| 5,414,260 A | 5/1995 | Takimoto et al. |
| 5,414,690 A | 5/1995 | Shido et al. |
| 5,416,331 A | 5/1995 | Ichikawa et al. |
| 5,418,363 A | 5/1995 | Elings et al. |
| 5,426,631 A | 6/1995 | Miyazaki et al. |
| 5,453,970 A | 9/1995 | Rust et al. |
| 5,455,420 A | 10/1995 | Ho et al. |
| 5,461,605 A | 10/1995 | Takimoto |
| 5,463,897 A | 11/1995 | Prater et al. |
| 5,471,458 A | 11/1995 | Oguchi et al. |
| 5,472,881 A | 12/1995 | Beebe et al. |
| 5,490,132 A | 2/1996 | Yagi et al. |
| 5,495,109 A | 2/1996 | Lindsay et al. |
| 5,502,306 A | 3/1996 | Meisburger et al. |
| 5,506,829 A | 4/1996 | Yagi et al. |
| 5,510,615 A | 4/1996 | Ho et al. |
| 5,519,686 A | 5/1996 | Yanagisawa et al. |
| 5,548,117 A | 8/1996 | Nakagawa |
| 5,559,328 A | 9/1996 | Weiss et al. |
| 5,560,244 A | 10/1996 | Prater et al. |
| 5,583,286 A | 12/1996 | Matsuyama |
| 5,602,820 A | 2/1997 | Wickramasinghe et al. |
| 5,610,898 A | 3/1997 | Takimoto |
| 5,623,476 A | 4/1997 | Eguchi |
| 5,634,230 A | 6/1997 | Maurer |
| 5,644,512 A | 7/1997 | Chernoff et al. |
| 5,679,952 A | 10/1997 | Lutwyche et al. |
| 5,717,680 A | 2/1998 | Yamano |
| 5,721,721 A | 2/1998 | Yanagisawa |
| 5,751,683 A | 5/1998 | Kley |
| 5,756,997 A | 5/1998 | Kley |
| 5,763,879 A | 6/1998 | Zimmer et al. |
| 5,804,709 A | 9/1998 | Bourgoin et al. |
| 5,821,410 A | 10/1998 | Xiang et al. |
| 5,825,670 A | 10/1998 | Chernoff et al. |
| 5,865,978 A | 2/1999 | Cohen |
| 5,874,726 A | 2/1999 | Haydon |
| 5,883,387 A | 3/1999 | Matsuyama et al. |
| 5,922,214 A | 7/1999 | Liu et al. |
| 6,031,756 A | 2/2000 | Gimzewski et al. |
| 6,066,265 A | 5/2000 | Galvin et al. |
| 6,101,164 A | 8/2000 | Kado et al. |
| 6,144,028 A | 11/2000 | Kley |
| 6,173,604 B1 | 1/2001 | Xiang et al. |
| 6,199,269 B1 * | 3/2001 | Greco et al. ............ 29/700 |
| 6,229,138 B1 | 5/2001 | Kley |
| 6,229,609 B1 | 5/2001 | Muramatsu et al. |
| 6,252,226 B1 | 6/2001 | Kley |
| 6,265,711 B1 | 7/2001 | Kley |
| 6,337,479 B1 | 1/2002 | Kley |
| 6,340,813 B1 | 1/2002 | Tominaga et al. |
| 6,353,219 B1 | 3/2002 | Kley |
| 6,517,249 B1 | 2/2003 | Doll |
| 2002/0007667 A1 | 1/2002 | Pohl et al. |

FOREIGN PATENT DOCUMENTS

| | | |
|---|---|---|
| JP | 61-133065 | 6/1986 |
| JP | 1-262403 | 10/1989 |
| JP | 7-105550 | 4/1995 |
| WO | WO 96/03641 A1 | 2/1996 |
| WO | WO 97/04449 | 2/1997 |
| WO | WO 98/34092 A2 | 8/1998 |
| WO | WO 01/03157 | 1/2001 |

OTHER PUBLICATIONS

Ager et al., "Multilayer hard carbon films with low wear rates," *Surface and Coatings Technology*, 91.91-94 (1997).

Betzig et al "Near-Field Optics: Microscopy Spectroscopy and Surface Modification Beyond the Diffraction Link" Science 257:(1992).

Dai et al. "Nanotubes as nanoprobes in scanning probe microscopy," Nature 384:147-150 (1996).

Davis "Deposition characterization and device development in diamond silicon carbide and gallium nitride thin films" J. Vac. Sci. Technol. A 11(4). Jul./Aug. (1993).

Diaz, D.C., et al., An Improved Fabrication Technique for Porous Silicon Rev. Sci. Instrum. 64 (2), Feb. 1993, pp. 507-509.

Givargizov et al "Growth of diamond particles on sharpened silicon tips" Materials Letters 18:(1993).

Gomyou, H., et al. Effect of Electrochemical Treatments on the Photoluminescence from Porous Silicon, J. Electrochem. Soc., vol. 139, No. 9, Sep. 1992, pp. L86-L88.

Nossarzewska-Orlowska, E., et al., Photoluminescence Properties of Porous Silicon Prepared by Electrochemical Etching of Si Epitaxial Layer. Acta Physica Polonica A, No. 4, vol. 84 (1993), pp. 713-718.

Rasmussen et al. "Fabrication of an All-metal Atomic Force Microscope Probe," IEEE (1997).

Rossow, U., et al., Influence of the Formation Conditions on the Microstructure of Porous Silicon Layers Studied by Spectroscopic Ellipsometry. Thin Solid Films, 255 (1995), pp. 5-8.

Smestad, G., et al., Photovoltaic Response in Electrochemically Prepared Photoluminescent Porous Silicon, Solar Energy Materials and Solar Cells, 26, pp. 277-283 (1992).

Tang, William Chi-Keung, "Electrostatic comb diva for resonant sensor and actuator applications," Abstract of dissertation at the University of California at Berkeley (1990).

Toledo-Crow et al "Near-field differential scanning optical microscope with atomic force regulation" Appl. Phys. Lett. 60: (1992).

Van Hulst et al "Near-field optical microscope using a silicon-nitride probe" Appl. Phys. Lett. 62. (1993).

Watson et al "The Radiation Patterns of Dielectric Rods-Experiment Theory" Journal of Applied Physics 19: (1948).

* cited by examiner

MANUFACTURING OF MICRO-OBJECTS SUCH AS MINIATURE DIAMOND TOOL TIPS

BACKGROUND OF THE INVENTION

The present invention relates generally to the manufacture and handling of micro-objects such as shaped tool heads or tips, and more particularly to the manufacture of miniature tools incorporating or consisting of shaped structures.

Manufacturing and other processes pertaining to scanning probe microscopy, nanomachining, micromachining, machining, optics, biotechnology, and biomedicine often require highly specialized miniature tools. Such tools typically consist of a shaped tool head formed and parted from a diamond or other hard material workpiece and mounted on a body or handle. Depending on the particular application, the spatial orientation of the tool head relative to the tool body, once mounted thereupon, may be critical to the usefulness of the miniature tool.

Execution of present methods for handling, aligning and mounting small structures, particularly structures smaller then 200 microns (referred to as micro-objects), is highly difficult and often results in uncertain orientation of the fine tool head structure relative to the tool body. Additionally, the miniature tool head, once separated from the workpiece from which it is formed or lapped, is easily misplaced in an attempt at further manipulation. Additionally, present methods employed in attempts at miniature tool head mass production are unable to provide consistently accurate precision in cutting or parting off the tool head. Finally, present methods do not satisfactorily enable determining the sharpness or fineness of the tool head prior to its mounting to the tool body.

SUMMARY OF THE INVENTION

In one aspect, the present invention provides techniques for producing and affixing a micro-object to a mounting structure at a desired relative orientation.

In a preferred embodiment of the invention, a shaped portion of a workpiece is caused to become embedded in a reference structure at a first relative orientation. The workpiece is parted into first and second portions, the first portion of which includes the embedded shaped portion of the workpiece and defines the micro-object. The reference structure is then aligned with the mounting structure at a second relative orientation, the first and second relative orientations defining the desired relative orientation of the micro-object and the mounting structure. The micro-object is bonded to the mounting structure while the micro-object remains embedded in the reference structure and the reference structure remains aligned with the mounting structure at the second relative orientation. The micro-object is then separated from the reference structure, whereupon the micro-object remains in the desired relative orientation with respect to the mounting structure.

In most embodiments, it is also desired to have the mounted micro-object at a particular location relative to the mounting structure. To this end, the workpiece is embedded at a first relative position on the reference structure, and the reference structure is aligned at a second relative position with respect to the mounting structure. The first and second relative positions thus define the desired location of the micro-object on the mounting structure.

According to a further aspect of the invention, the reference structure and the embedded shaped portion of the workpiece after parting represents a useful article of manufacture as an intermediate to the ultimate manufacture of the composite article comprising the micro-object bonded to the mounting structure.

According to a further aspect of the invention, a micro-object having a desired sharp point or edge may be optically tested during fabrication. This is accomplished by applying a known force to the workpiece against an optically opaque layer disposed on a transparent substrate, passing light down the workpiece toward the opaque layer, and determining whether the shaped portion of the workpiece has sufficiently penetrated the opaque layer so that light passed through the workpiece can be detected on the remote side of the transparent substrate. If the light is not detected, the shaped portion of the workpiece is considered to be insufficiently sharp, and the workpiece can be subjected to further shaping operations. While it is possible to perform this testing during the process of aligning and embedding the micro-object in the reference structure, it is generally preferred to perform this testing when the workpiece is being shaped.

In an alternative arrangement, after the force is applied to cause penetration of the opaque layer by the shaped portion of the workpiece, the substrate and the workpiece are moved laterally with respect to one another so as to form a scratch on the opaque layer. The workpiece can be removed from the vicinity of the opaque layer and the amount of light transmitted through the scratch can be measured. If the amount of light is sufficient, the shaped portion of the workpiece is considered to be sufficiently sharp.

A further understanding of the nature and advantages of the present invention may be realized by reference to the remaining portions of the specification and the drawings.

DESCRIPTION OF THE SPECIFIC EMBODIMENTS

Figure 1A:
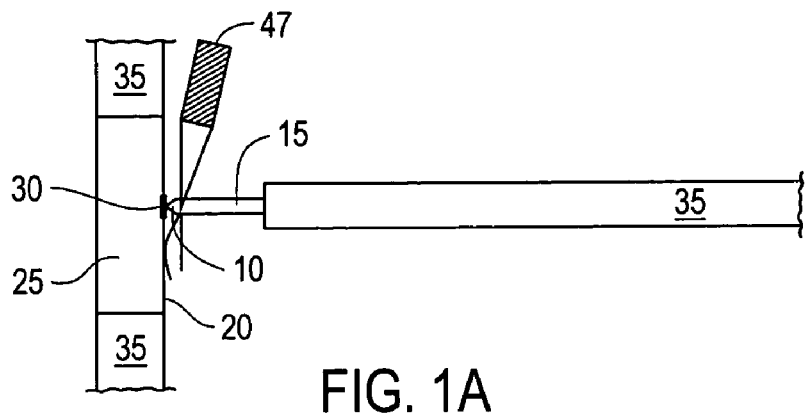
FIG. 1A is a schematic side plan view of a workpiece contacting a reference surface according to principles of the present invention.
Figure 1B:
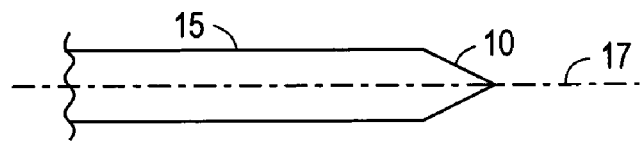
FIG. 1B is a partial side plan view of a workpiece according to principles of the present invention.

FIG. 1A is a schematic side plan view showing elements of an embodiment of the invention. In brief, embodiments of the invention include methods and apparatus for fabricating, aligning, and mounting micro-objects on supporting structures. In the illustrated embodiment, the ultimate micro-object is formed from a shaped portion 10 of a workpiece 15. FIG. 1B is an enlarged view of the workpiece 15, showing the shaped portion 10 and a central axis 17 of the workpiece. The particular technique for shaping the end of the workpiece 15 is not a part of the invention, and will not be described in detail. Suffice it to say that the shaped portion may be formed by techniques such as chemically or abrasively lapping, etching, laser forming, ion milling or nano-machining.

It should be noted that the term micro-object refers to objects having dimensions in the tens of microns to hundreds of microns. However, the sharpness (measured in terms of a radius of curvature) of such micro-objects is in the nanometer range. Further, the workpiece from which micro-objects are made according to embodiments of the invention have dimensions in millimeters. For example a typical diamond workpiece might be 10–12 mm long and have a transverse rectangular or triangular cross sectional configurations with dimensions on the order of 4–5 mm.

The material of workpiece 10 depends on the application of the micro-object. If the micro-object is to define a tool tip, the workpiece is typically composed of a hard material such as diamond, cubic boron nitride, carbon nitride, titanium nitride, tungsten carbide, titanium carbide, silicon nitride, or other materials. In some applications, such as microlenses, hardness of the workpiece is not the primary criterion, and the material can be chosen to satisfy other requirements such as providing desired optical properties. The shaped portion 10 is preferably of pyramidal, conical, blade or other sharp configuration known in the art. However, for some other applications, such as microlenses, the shaped portion may have a rounded shape (e.g., spherical, aspheric, cylindrical, etc.).

In a specific application, the micro-object is a diamond tool tip having a pyramidal shape (three sides and a triangular base or four sides and a quadrilateral base), and the supporting structure is a silicon cantilever structure. The axis 17 may be chosen to correspond to one of the diamond's hard axes (100 or 101). It is noted that the techniques described below can be used to fabricate, align, and mount micro-objects with dimensions of several hundred microns on a side. However, the techniques are readily extendible to significantly smaller micro-objects, say to micro-objects that are smaller than 200 microns on a side, and even micro-objects that have dimensions on the order of 15–25 microns. While micro-objects having dimensions in the range of a few hundred microns to several hundred microns can be manipulated by conventional techniques, the conventional techniques break down for dimensions below about 200 microns on a side.

A method according to an embodiment of the present invention uses a reference surface 20 on a reference structure 25, which may be composed of a transparent or semi-transparent material such as glass, Plexiglass®, or quartz. Disposed along reference surface 20 is a trapping layer 30 that preferably comprises a non-permanent adhesive. Trapping layer 30 may further comprise a metal foil or coating. A possible configuration for the trapping layer includes a composite comprising a 30-nm chromium layer, a 15-micron adhesive layer, and a 40-nm metal overcoat. Also suitable is a single layer of copper or indium on the order of 30–40 microns in thickness. In an alternative embodiment, a MEMS device (not shown) known in the art and operating as a clamp or other restraining device under electrical, piezoelectrical, piezoresistive, electrothermal or electrostatic principles may be substituted for trapping layer 30. Such a MEMS device may or may not be conjoined with a reference surface 20 and may thus itself serve as a reference surface. A jig 35 secures workpiece 15 in relative position to reference surface 20. Jig 35 indexes reference surface 20 to a desired orientation relative to workpiece 15.

FIGS. 2A–2D show a sequence of operations for processing workpiece 15 to provide the desired micro-object at a known position and orientation relative to reference structure 25. The result of these operations can be considered an intermediate article for the fabrication of the ultimate composite article, namely the micro-object mounted to a support structure.

Figure 2A:
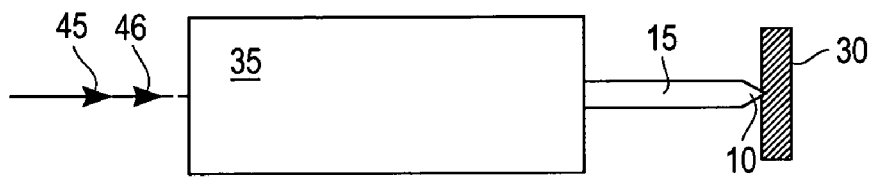
FIG. 2A is a schematic side plan view of a workpiece contacting a trapping layer according to principles of the present invention.
Figure 2B:
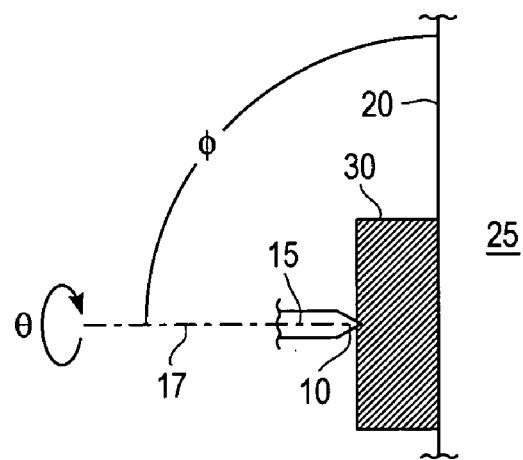
FIG. 2B is a schematic side plan view of a workpiece penetrating a trapping layer according to principles of the present invention.

As shown in FIGS. 1A and 2A, jig 35 first places a first known force 45 against workpiece 15 causing shaped portion 10 to contact trapping layer 30. As best illustrated in FIG. 2B, the central axis 17 of workpiece 15 is oriented to preselected polar and azimuthal angles $\phi$ and $\theta$ with respect to reference surface 20. Jig 35 then places a second known force 46 against workpiece 15 causing shaped portion 10 to penetrate and become embedded in trapping layer 30. As is well known, the polar angle $\phi$ and the azimuthal angle $\theta$ in spherical coordinates correspond to latitude and longitude.

Figure 2C:
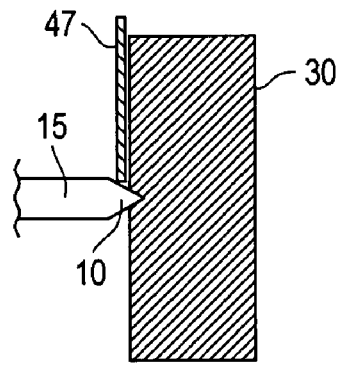
FIG. 2C is a schematic side plan view of a workpiece just prior to its parting according to principles of the present invention.

As shown in FIGS. 1A and 2C, workpiece 15 is then parted, illustratively by a laser apparatus 47, at a predetermined location along its length. Parting of workpiece 15 may be accomplished by laser, chemical, abrasive cutting, or other techniques known in the art. The parting operation results in a parting surface, which may be planar; however, depending on the nature of the parting technique, the parting surface may be curved. Further, while some applications would have the parting surface parallel to reference surface 20, the parting surface may have any desired orientation relative to the reference surface.

Figure 2D:
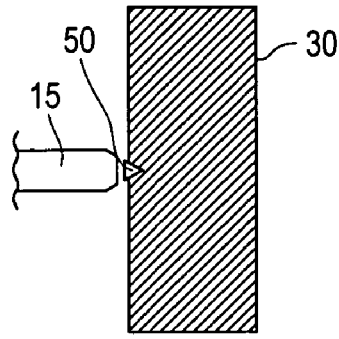
FIG. 2D is a schematic side plan view of a parted workpiece according to principles of the present invention.

As a result of this parting and as best illustrated in FIG. 2D, a micro-object 50 comprising shaped portion 10 remains embedded in trapping layer 30. The micro-object at this point has its central axis 17 at a desired orientation relative to reference surface 20, and its now-exposed parting surface at its own desired orientation relative to the reference surface. As mentioned above, the present method, while applicable to relatively large micro-objects, is particularly suited for use where none of the dimensions of micro-object 50 exceeds 200 microns in length.

The non-embedded portion of the workpiece 15 is then removed from the vicinity of the micro-object and the reference structure. Because micro-object 50 is embedded in trapping layer 30, transporting reference structure 25 to another location for sale or further processing of micro-object 50 involves minimal risk of misplacing micro-object 50. In at least some embodiments, it is desired to fabricate multiple micro-objects on the same reference structure. In such a case, the workpiece, after the parting, can be reworked to again shape its end. The newly reshaped end of the workpiece can then be oriented and positioned at a new location on the reference structure and the process of parting repeated.

Figure 3A:
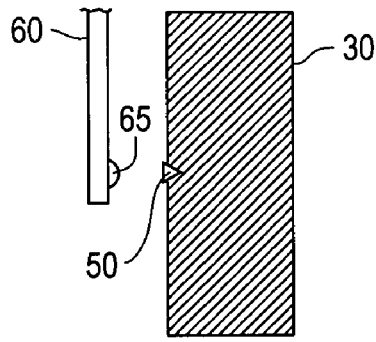
FIG. 3A is a schematic side plan view of a tool body just prior to its capture of a tool head according to principles of the present invention.
Figure 3B:
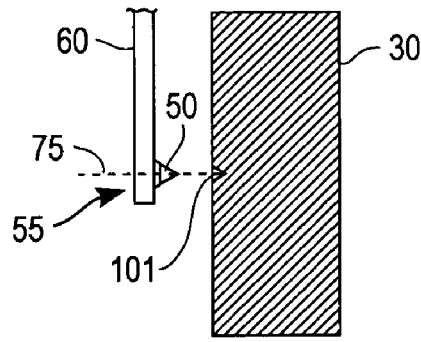
FIG. 3B is a schematic side plan view of the removal from a trapping layer of a tool head by a tool body according to principles of the present invention.
Figure 4A:
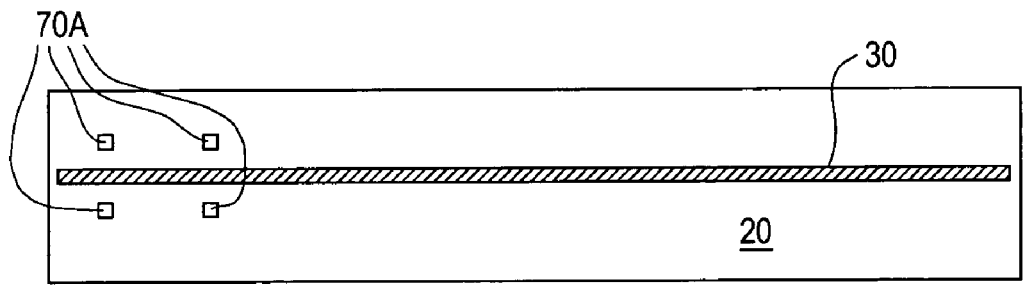
FIG. 4A is a top plan view of a reference surface according to principles of the present invention.
Figure 4B:
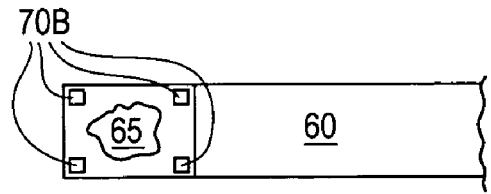
FIG. 4B is a top plan view of a tool body according to principles of the present invention.

FIGS. 3A and 3B illustrate the process of constructing a microtool 55 incorporating micro-object 50 mounted to a tool body 60. Tool body 60 may be a silicon cantilever structure or other mounting device known in the art, and carries on a surface thereof an adhesive 65. Adhesive 65 may consist of thermal glue, optical cement, epoxy cement or other suitable adhesive known in the art. Currently, epoxy is used to effect the bonding. Additionally, solders, low-temperature oxides or other eutectic materials could be used. For example, the surfaces to be bonded could be coated with a titanium layer and/or a nickel layer and then soldered. Alternatively, the surfaces to be bonded could be coated, say with a titanium layer and/or one of an aluminum or copper layer, and then welded. FIGS. 4A and 4B are top plan views of reference structure 25 (reference surface 20 being visible in this view) and tool body (mounting structure) 60, respectively. These views are shown to facilitate an understanding of the alignment of tool tip (micro-object) 50 and tool body (mounting structure) 60.

Various alignment systems known in the art may be used to ensure consistent capture by adhesive 65 of micro-object 50 at the desired orientation relative to tool body 60. In the preferred embodiment of the present invention, and as best illustrated in FIGS. 4A and 4B, each of reference surface 20 and tool body 60 includes, respectively, corresponding alignment marks 70A, 70B. Once micro-object 50 has been fixedly captured by the adhesive disposed on tool body 60, micro-object 50 is separated from trapping layer 30 by moving tool body 60 away from trapping layer 30. By employing principles of the present invention, micro-object 50 may be fixedly attached to tool body 60 such that the central axis 75 of micro-object 50 may project from tool body 60 in any desired direction in accordance with the intended use of microtool 55.

In order to reduce the force required to separate micro-object 50 from trapping layer 30, local heating of trapping layer 30 proximal to micro-object 50 may be employed. Removal of micro-object 50 from trapping layer 30 leaves within trapping layer 30 an imprint 101 of micro-object 50. By scanning the imprint with an atomic force microscope or other suitable means, a traceable record of the configuration of micro-object 50 may be obtained. If, as discussed above, a MEMS device is substituted for trapping layer 30, actuation of such MEMS device may effect release of micro-object 50.

The results of the fabrication techniques described above are a captured micro-object and a composite structure comprising the micro-object and support structure. The angular alignment achieved by the invention can be significantly better than that achievable by prior art techniques. For example, the prior art is typically characterized by micro-object alignment on the order of ±10 degrees, while the present invention provides alignments ±5 degrees or better, and preferably to a level of ±1 degree or better, and even at the level of ±0.5 degrees.

Accordingly, a composite tool fabricated in accordance with embodiments of the invention may comprise a micro-object having a dimensions less than 200 microns with angular precision of the alignment between the micro-object and the support structure of better than ±5 degrees. Indeed, the composite tool may comprise a micro-object having a dimensions on the order of 25–50 microns with angular precision of the alignment between the micro-object and the support structure of better than ±1 degree.

Preferably, the sharpness of shaped portion 10 is tested prior to insertion into trapping layer 30. Such pre-testing typically involves a penetration or controlled scratch of a surface with a known force, analysis of the penetration or scratch providing a go/no go indication of a particular state of sharpness. Such pre-testing has the advantage of allowing determination of the suitability for intended purpose of shaped portion 10 before workpiece 15 is parted so as to permit rework as necessary.

Figure 5A:
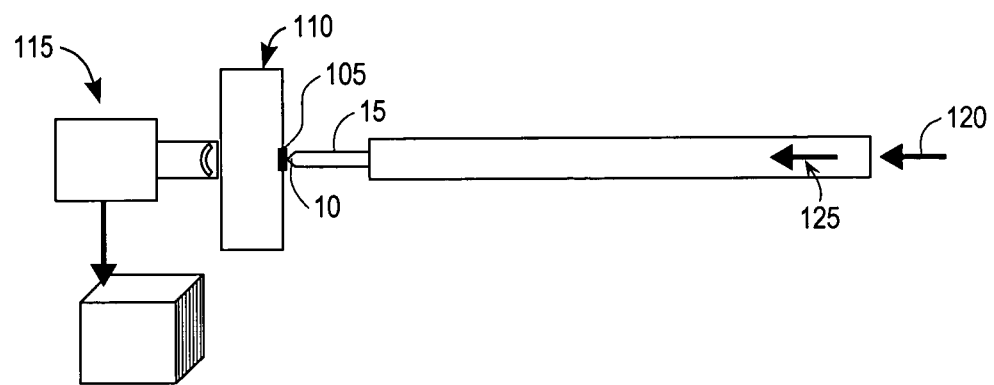
FIG. 5A is a side plan view of an arrangement for sharpness testing of a workpiece according to principles of the present invention.

FIG. 5A illustrates one approach for testing the sharpness of shaped portion 10 according to principles of the present invention. The technique includes forming an optically opaque layer of material 105 on one side of a substrate 110 and providing an optical detector 115 with suitable collection optics on the other side of substrate 110. Substrate 110 is preferably composed of a transparent or semi-transparent material having an index of refraction that matches or is greater than that of workpiece 15. The measurement is effected by exerting a known force 120 against workpiece 15, causing shaped portion 10 to penetrate opaque layer 105, and directing light 125 into workpiece 15 so as to propagate along workpiece 15 toward shaped portion 10. The penetration depth depends on the hardnesses of workpiece 15 and opaque layer 105, force 120, and the sharpness of shaped portion 10. The technique extracts information regarding the sharpness by determining information regarding the depth of penetration. Alternatively, workpiece 15 and/or substrate 110 may be composed of a non-transparent material. In such case, sharpness information may be similarly extracted through the use of electromagnetic radiation, other than light, such as infrared, medium infrared, ultraviolet and soft x-ray.

Initial design requires a determination of the thickness of opaque layer 105 and the force 120 to be applied. This is done by assuming that shaped portion 10 has a sharpness corresponding to the minimum sharpness that will be considered acceptable for incorporation into a composite structure. It is then straightforward to determine a thickness of the opaque material and a force such that force 120 causes shaped portion 10, having such an acceptable degree of sharpness, to penetrate opaque layer 105 to a depth that is within the tunneling distance of transparent substrate 110. The computation provides a series of possible thickness-force value pairs that can be used. The choice can be made by restricting the thickness and force to practical values. For example, force 120 should be small enough so as not to subject workpiece 15 to possible damage, while the thickness should be large enough to provide the needed opacity. In some instances, it may be desirable to have a composite layer structure on transparent substrate 110. This composite layer structure may include a thin layer of soft highly opaque material underlying a harder layer of material having less opacity. A possible configuration for such a layer structure includes a composite comprising a 2-micron aluminum layer, a 500-nm tungsten layer, a 100-nm titanium layer, and a quartz layer. Thus, if force 120 is sufficient to cause shaped portion 10 to penetrate the harder material, the softer opaque material will be penetrated easily.

There are a number of possible test protocols. For example, the test can be run so if an insufficiently sharp shaped portion 10 provides transmitted light 125 below a threshold, workpiece 15 is withdrawn from the vicinity of opaque layer 105 and the end of workpiece 15 subjected to further shaping operations. Alternatively, it is possible, in the event that the transmitted light 125 is below the threshold, to increase force 120 to an additional known value, and if the transmitted light 125 is now above the threshold, to flag shaped portion 10 as being suitable for parting and mounting for use in a less demanding application.

While it is possible to perform this testing during the process of aligning and embedding micro-object 50 in reference structure 25, it is generally preferred to perform this testing when workpiece 15 is being shaped. Thus, it is possible to optimize the properties of opaque layer 105 for the optical testing and the properties of trapping layer 30 independently. Further, it is generally contemplated that a failure during the optical testing will result in workpiece 15 subjected to rework, which is not entirely consistent with the orderly flow of the process outlined in connection with FIGS. 2A–2D.

Figure 5B:
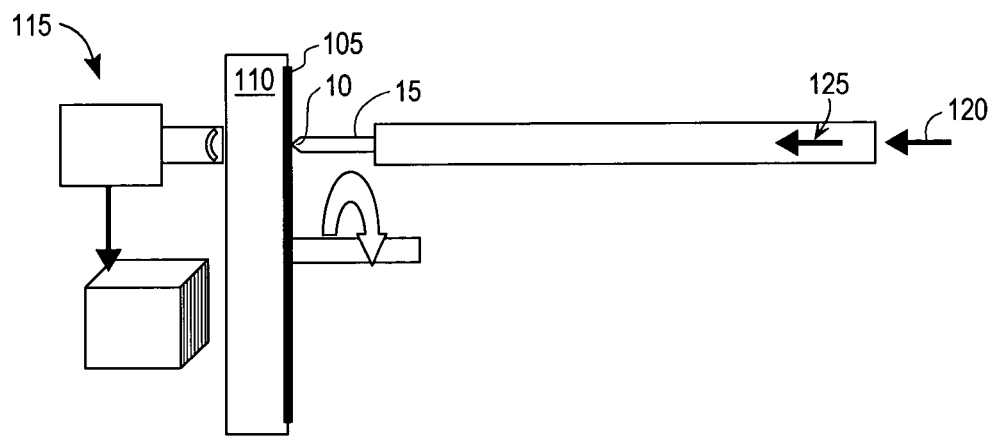
FIG. 5B is a side plan view of an alternative arrangement for sharpness testing of a workpiece according to principles of the present invention.

FIG. 5B shows an alternative configuration in which substrate 110 and workpiece 15 are moved laterally with respect to one another (by relative rotation or translation) after shaped portion 10 has penetrated opaque layer 105. This causes shaped portion 10 to scratch opaque layer 105. Workpiece 15 is then removed from the vicinity of opaque layer 105 and the amount of light 125 transmitted through the scratch is measured. If the amount of light 125 is sufficient, shaped portion 10 is considered to be sufficiently sharp. This technique has the additional advantage of testing for mechanical defects in shaped portion 10. If shaped portion 10 fractures when subjected to the transverse forces caused by the relative movement, workpiece 15 can be reworked before shaped portion 10 is subjected to the process outlined in connection with FIGS. 2A–2D.

Although the invention has been described in terms of the illustrative embodiment, it will be appreciated by those skilled in the art that various changes and modifications may be made to the illustrative embodiment without departing from the spirit or scope of the invention.

For example, while reference structure 25 is shown as having trapping layer 30 on reference surface 20, this is not necessary. So long as the shaped portion is embedded in the trapping layer at a known orientation to the reference structure, and the reference structure can be aligned with the mounting structure, the trapping layer can be configured to optimize or enhance other design considerations.

Therefore, the above description should not be taken as limiting the scope of the invention as defined by the claims.

What is claimed is:

1. A method of affixing a micro-object to a mounting structure at a desired relative orientation, the method comprising:
   embedding a shaped portion of a workpiece in a reference structure at a first relative orientation;
   parting the workpiece into first and second portions, the first portion of which includes the embedded shaped portion of the workpiece and defines the micro-object;
   aligning the reference structure with the mounting structure at a second relative orientation, the first and second relative orientations defining the desired relative orientation of the micro-object and the mounting structure;
   bonding the micro-object to the mounting structure while the micro-object remains embedded in the reference structure and the reference structure remains aligned with the mounting structure at the second relative orientation; and
   separating the micro-object from the reference structure, whereupon the micro-object remains in the desired relative orientation with respect to the mounting structure.

2. The method of claim 1 wherein the reference structure and the mounting structure are aligned so as to define a desired relative spatial position between the reference structure and the mounting structure.

3. The method of claim 1, wherein the micro-object has dimensions that are less than 200 microns.

4. The method of claim 1, wherein the micro-object has dimensions that are less than 100 microns.

5. The method of claim 1, wherein the micro-object has dimensions that are on the order of 15–25 microns.

6. The method of claim 1, wherein the micro-object is aligned relative to the mounting structure to an angular precision of ±5 degrees or better.

7. The method of claim 1 wherein:
   the reference structure has a trapping layer disposed thereon;
   embedding the shaped portion of the workpiece in the reference structure includes inserting the shaped portion into the trapping layer; and
   separating the micro-object from the reference structure includes withdrawing the micro-object from the trapping layer.

8. The method of claim 1 wherein:
   the reference structure has a MEMS device connected thereto;
   embedding the shaped portion of the workpiece in the reference structure includes operating the MEMS device to restrain the shaped portion; and
   separating the micro-object from the reference structure operating the MEMS device to release the shaped micro-object.

9. A method of fabricating a composite article having a micro-object supported on a mounting structure at a desired orientation with respect to the support structure, the method comprising:
   providing a workpiece having first and second portions, the first portion of the workpiece having a shape suitable for defining at least a portion of the micro-object;
   immobilizing the first portion of the workpiece relative to a reference structure with the first portion of the workpiece at a first orientation with respect to the reference structure;
   separating the first portion of the workpiece from the second portion of the workpiece while maintaining the first portion of the workpiece immobilized relative to the reference structure at the first orientation with respect to the reference structure, whereupon the first portion of the workpiece, so separated, defines the micro-object, with the micro-object, so separated, remaining at the first orientation with respect to the reference structure;
   aligning the reference structure with the mounting structure at a second orientation with respect to the mounting structure, the first orientation of the micro-object relative to the reference structure and the second orientation of the reference structure relative to the mounting structure defining the desired orientation of the micro-object with respect to the mounting structure;
   bonding the micro-object to the mounting structure while the micro-object remains immobilized relative to the reference structure and the reference structure remains aligned with the mounting structure at the second orientation with respect to the mounting structure; and
   releasing the micro-object from the reference structure.

10. The method of claim 9 wherein the reference structure and the mounting structure are aligned so as to define a desired relative spatial position between the reference structure and the mounting structure.

11. The method of claim 9, wherein the micro-object has dimensions that are less than 200 microns, and the micro-object is aligned relative to the mounting structure to an angular precision of ±5 degrees or better.

12. The method of claim 9, wherein the micro-object has dimensions that are on the order of 15–25 microns.

13. The method of claim 9, wherein said bonding comprises welding a first bonding layer disposed on a surface of the micro-object to a second bonding layer disposed on a surface of the mounting structure, the first and second bonding layers being of the same material.

14. The method of claim 9, wherein said bonding comprises soldering the micro-object to the mounting structure.

15. The method of claim 9 wherein:
the reference structure has a trapping layer disposed thereon;
immobilizing the first portion of the workpiece relative to the reference structure includes inserting the first portion of the workpiece into the trapping layer; and
releasing the micro-object from the reference structure includes withdrawing the micro-object from the trapping layer.

16. The method of claim 9 wherein:
the reference structure has a MEMS device connected thereto;
immobilizing the first portion of the workpiece relative to the reference structure includes operating the MEMS device to restrain the first portion of the workpiece; and
releasing the micro-object from the reference structure includes operating the MEMS device to no longer restrain the first portion of the workpiece.

17. A composite article of manufacture comprising a micro-object mounted on a mounting structure where the dimensions of the micro-object are less than 200 microns, and the micro-object is aligned relative to the mounting structure to an angular precision of better than ±1 degree, wherein the micro-object is formed by:
immobilizing a shaped portion of a workpiece relative to a reference structure, the workpiece having a significantly larger dimensions than dimensions of the shaped portion;
aligning the workpiece relative to the reference structure;
parting the workpiece to leave a parted portion includes the shaped portion still immobilized and aligned relative to the reference structure, the parted portion defining the micro-object;
aligning the reference structure relative to the mounting structure;
bonding the parted portion to the mounting structure; and
separating the parted portion from the reference structure.

18. A method of affixing a tool head to a tool body, the method comprising:
causing a shaped portion of a workpiece to penetrate a trapping structure at a desired orientation;
parting said workpiece, the tool head comprising a parted portion of said workpiece that includes said shaped portion and an exposed portion, with said shaped portion remaining in said trapping structure; and
fastening the tool body to the exposed portion of the tool head.

19. The method of claim 18, further comprising:
positioning a target surface and said workpiece relative to one another by means of a jig, said trapping structure being disposed upon said target surface.

20. The method of claim 19, wherein:
said target surface comprises a substantially transparent material.

21. The method of claim 19, wherein said causing comprises a force being axially applied to said workpiece by said jig.

22. The method of claim 19, wherein the tool body has an adhesive coating disposed on a surface thereof.

23. The method of claim 22, further comprising aligning said tool body surface with said target surface.

24. The method of claim 23, wherein said tool body surface and said target surface are aligned using corresponding marks disposed on both said tool body surface and said target surface.

25. The method of claim 22, wherein said fastening comprises applying said adhesive coated surface to the tool head.

26. The method of claim 25, wherein said fastening comprises setting said adhesive.

27. The method of claim 26, wherein said setting comprises irradiating said adhesive.

28. The method of claim 18, wherein:
said workpiece is coupled to a holder.

29. The method of claim 18, wherein:
said trapping structure comprises a layer of opaque material.

30. The method of claim 18, wherein said workpiece is parted by a laser.

31. The method of claim 18, further comprising determining the sharpness of the tool head.

32. The method of claim 31, wherein:
the tool head is transmissive; and
said determining the sharpness comprises directing light through the tool head and determining at least one characteristic of said light directed through the tool head.

33. The method of claim 18, further comprising, after said parting and prior to said fastening, transporting said trapping structure to a location remote from the site of said parting step.

34. The method of claim 18, wherein said workpiece is parted along a plane above said upper surface of said trapping structure.

35. The method of claim 18, further comprising removing the tool head from said trapping structure.

36. The method of claim 35, wherein said removing comprises drawing the tool body away from said trapping structure.

37. The method of claim 36, wherein:
said trapping structure is comprises a trapping layer; and
said removing further comprises treating an area of said trapping layer proximate to the tool head.

38. The method of claim 35, further comprising determining a profile record of the tool head.

39. The method of claim 38, wherein:
said trapping structure comprises a trapping layer;
said removing causes a negative form of the tool head to remain in said trapping layer; and
said determining comprises scanning said negative form.

40. A method of constructing a tool, the method comprising:
causing a shaped portion of a workpiece to penetrate a trapping structure;
parting said workpiece along a plane parallel to an upper surface of said trapping structure, whereby a parted portion of said workpiece includes said shaped portion and an exposed portion, and said shaped portion remains in said trapping structure; and
fastening a tool body to said exposed portion of said parted portion.

41. The method of claim 40, wherein said workpiece is parted by a laser.

42. The method of claim 40, further comprising determining the sharpness of said shaped portion.

43. The method of claim 42, wherein:
said shaped portion is transmissive; and
said determining comprises directing light through said shaped portion and determining at least one characteristic of said light directed through said shaped portion.

44. The method of claim 40, wherein said workpiece is parted along a plane above said upper surface of said trapping structure.

45. A method of constructing a tool, the method comprising:
causing a shaped portion of a workpiece to penetrate a trapping structure;
parting said workpiece, whereby a parted portion of said workpiece remains in said trapping structure;
positioning a tool body's target surface and said workpiece relative to one another by means of a jig, said trapping structure being disposed upon said target surface; and
fastening said tool body to said parted portion.

46. The method of claim 45, wherein said causing comprises a force being axially applied to said workpiece by said jig.

47. A method of constructing a tool, the method comprising:
causing a shaped portion of a workpiece to penetrate a trapping structure;
parting said workpiece, whereby a parted portion of said workpiece remains in said trapping structure;
thereafter, transporting said trapping structure to a location remote from the site of said parting step; and
thereafter, fastening said tool body to said parted portion.

48. The method of claim 47, wherein said tool body has an adhesive coating disposed on a surface thereof.

49. The method of claim 48, further comprising aligning said tool body surface with said target surface.

50. The method of claim 49, wherein said aligning comprises aligning corresponding marks disposed on both said tool body surface and said target surface.

51. A tool, comprising:
a tool body; and
a tool head coupled with said tool body, wherein said tool head is a portion of a significantly larger workpiece from which said tool head was parted while disposed within a trapping layer;
said tool head having been aligned relative to said trapping layer by aligning said workpiece with the trapping layer prior to parting;
said trapping layer having been aligned with said tool body after parting.

52. The tool of claim 51, wherein:
said tool head is no more than 200 microns in length.

53. The tool of claim 51, wherein said tool head is transmissive.

54. The tool of claim 53, wherein said tool head has at least one characteristic associated therewith, said characteristic being determinable from light directed through said tool head.

55. The tool of claim 51, further comprising:
a first bonding layer disposed on the tool head; and
a second bonding layer disposed on the tool body, the first and second bonding layers being of the same material, the tool body and tool head being coupled by welding the first bonding layer to the second bonding layer.

56. The tool of claim 51, wherein the tool head is soldered to the tool body.

57. A method of affixing a tool head to a tool body, the method comprising:
causing a shaped portion of a workpiece to penetrate a trapping structure for fixing said workpiece in said trapping structure;
parting said workpiece along a plane parallel to an upper surface of said trapping structure for forming the tool head from said workpiece, the tool head having dimensions less than 200 microns and including said shaped portion and an exposed portion with said shaped portion remaining in said trapping structure; and
fastening said exposed portion of the tool body to the tool head while said shaped portion remains in said trapping structure.

* * * * *